United States Patent [19]

MacNeill

[11] Patent Number: 4,951,954
[45] Date of Patent: Aug. 28, 1990

[54] HIGH TEMPERATURE LOW FRICTION SEAL

[75] Inventor: Gerald F. MacNeill, Bristol, R.I.

[73] Assignee: ACS Industries, Inc., Woonsocket, R.I.

[21] Appl. No.: 397,314

[22] Filed: Aug. 23, 1989

[51] Int. Cl.$^5$ .................. B32B 31/06; B32B 5/28; F16J 15/12

[52] U.S. Cl. .................. 277/230; 277/229; 277/DIG. 6; 428/65; 428/247; 428/254; 428/256; 264/320; 264/324; 264/501; 264/512; 264/516

[58] Field of Search .............. 428/65, 254, 247, 256; 277/229, 230, DIG. 6; 264/501, 512, 516, 320, 324

[56] References Cited

U.S. PATENT DOCUMENTS

| | | | |
|---|---|---|---|
| 2,116,000 | 5/1938 | Peterson | 154/45.5 |
| 4,271,228 | 6/1981 | Foster et al. | 428/281 |
| 4,425,465 | 1/1984 | Padget et al. | 524/450 |
| 4,477,094 | 10/1984 | Yamamoto et al. | 277/235 |
| 4,559,249 | 12/1985 | Arigaya et al. | 428/36 |
| 4,601,476 | 7/1986 | Usher et al. | 277/230 |

FOREIGN PATENT DOCUMENTS

| | | | |
|---|---|---|---|
| 58-34230 | 2/1983 | Japan | 428/244 |
| 149472 | 9/1983 | Japan | 277/235 R |

Primary Examiner—Alexander S. Thomas
Attorney, Agent, or Firm—Salter & Michaelson

[57] ABSTRACT

A high temperature low friction dynamic seal includes a wire mesh base portion and a compressed shell portion on the base portion. The shell portion includes between approximately 2% and 30% of high aspect ratio vermiculite having a mean particle size of less than approximately 50 microns, between approximately 10% and 88% of high temperature resistant fibers and between approximately 10% and 88% of one or more a solid lubricants selected from a group consisting of barium fluoride, calcium fluoride, cerium fluoride and a eutectic of barium fluoride and calcium fluoride. The method of forming the seal includes the steps of forming a compressed wire mesh base portion, applying an aqueous paste-like mixture of the shell portion components to the base portion, evaporating the water from the shell portion and compressing the shell portion and the base portion.

20 Claims, 2 Drawing Sheets

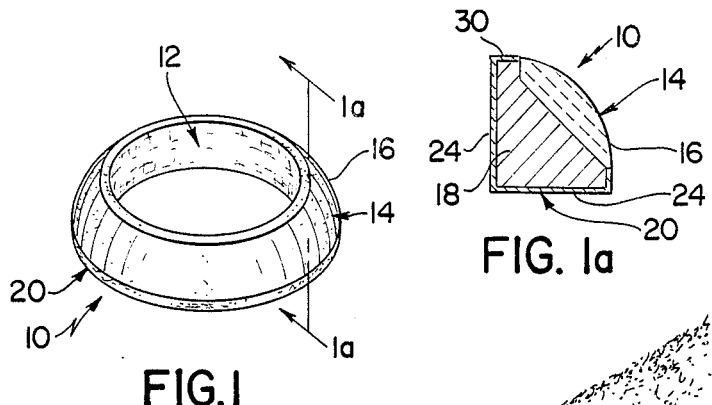
FIG. 1
FIG. 1a
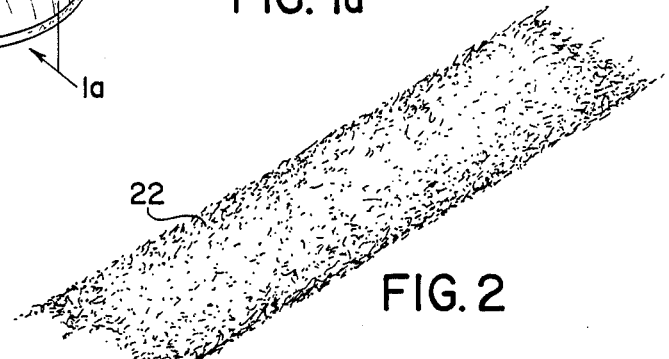
FIG. 2
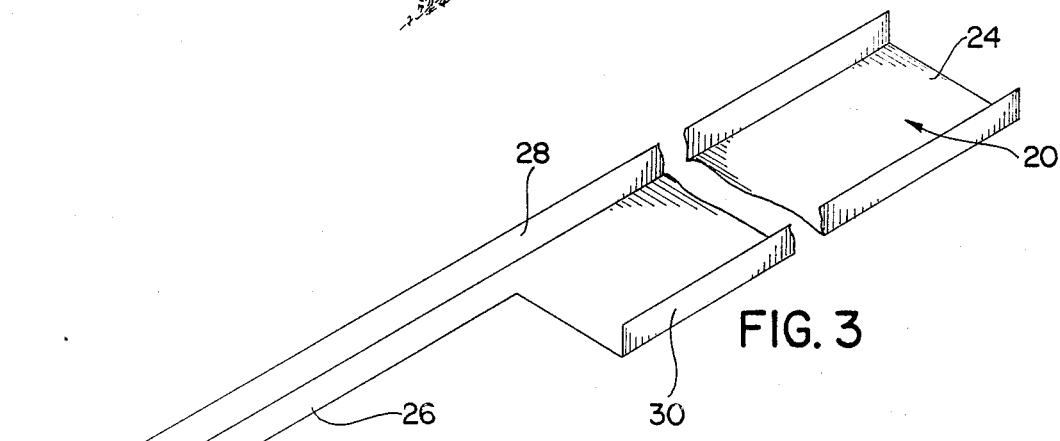
FIG. 3
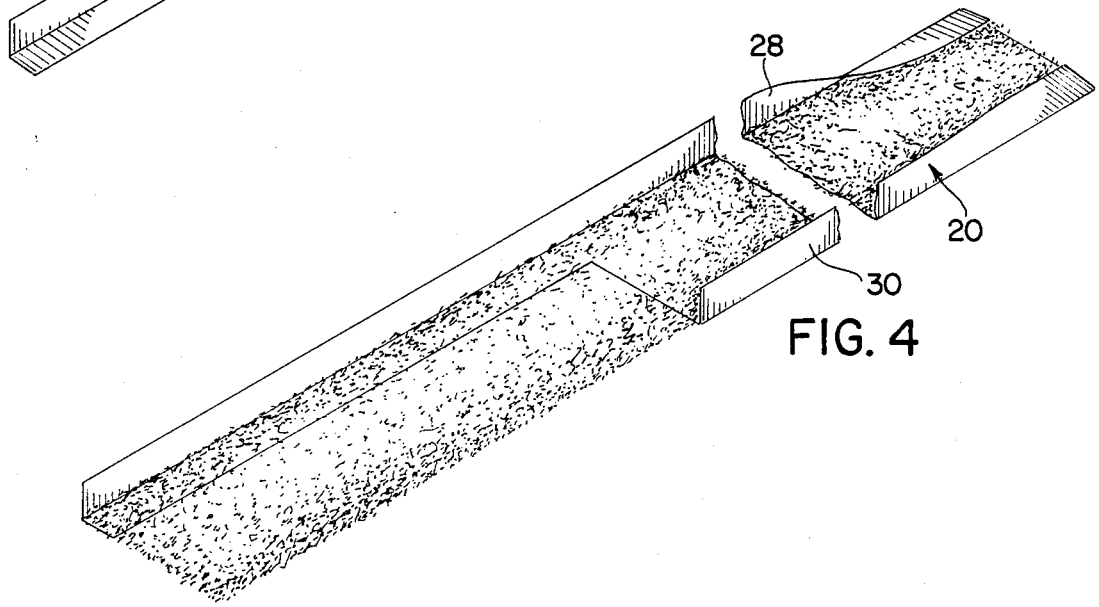
FIG. 4

HIGH TEMPERATURE LOW FRICTION SEAL

BACKGROUND AND SUMMARY OF THE INVENTION

The instant invention relates to high temperature seals and more particularly to a high temperature low friction dynamic seal for use in applications, such as in the exhaust system of an automobile.

It is generally recognized that the fuel efficient engines of most modern automobiles operate at substantially higher temperatures than the less efficient engines of older automobiles. In this regard, it is well recognized that the operating temperature of an internal combustion engine is directly related to combustion efficiency and that as a result, an engine which is designed for maximum fuel efficiency inherently operates at higher temperatures than a less efficient engine. Further, the temperatures of the exhaust gases emitted by a fuel efficient engine are normally substantially higher than the temperatures of the exhaust gases from a less efficient engine. For this reason, the various components of the exhaust systems of most modern automobiles must generally be capable of withstanding prolonged exposure to substantially higher temperatures than the components of the exhaust systems of older automobiles.

In addition to the above, it has been found that in many cases it is advantageous to mount the engine of a front wheel drive automobile in transverse relation. However, it has been further found that when an engine is transversely mounted in an automobile it is generally necessary for the exhaust system of the automobile to be at least partially flexible in order to accommodate normal movement of the engine during acceleration and deceleration. Specifically, it has been found that it is generally necessary to provide at least one flexible joint in the exhaust system of a vehicle having a transversely mounted engine in order to compensate for relative movement between the engine and the vehicle chassis. Further, it has been found that in order to provide an effective leak-proof joint of this type for a vehicle having a relatively fuel efficient engine it is necessary for the joint to include a low friction seal which is capable of withstanding temperatures of at least approximately 1400° F. However, while various seals have been heretofore available which are capable of withstanding temperatures in this range, virtually all of the heretofore available seals for applications of this type have been found to produce objectionable squeaking noises when they are used in flexible joints in exhaust systems.

The instant invention provides an effective dynamic seal which can be utilized in a flexible joint of an exhaust system of a modern automobile without producing objectionable squeaking noises. Specifically, the seal of the instant invention is capable of effectively sealing a flexible joint in a high temperature exhaust system of a modern automobile without producing squeaking noises. In particular, the seal of the instant invention comprises a compressed wire mesh base portion and a high temperature resistant low friction dry rubbing composite or shell portion on the base portion. The base portion is preferably formed in a circular ring-like configuration from compressed knitted wire mesh and the shell portion is preferably applied to the outer surface of the base portion. The shell portion comprises between approximately 2% and 30% by weight of vermiculite having an aspect ratio (length or width/thickness) of greater than approximately 10 and a mean particle size of less than approximately 50 microns. The shell portion further comprises between approximately 10% and 88% by weight of high temperature resistant fibers having a melting point of at least approximately 1400° F. and between approximately 10% and 88% by weight of a solid lubricant consisting of one or more materials selected from a group consisting of barium fluoride, calcium fluoride, cerium fluoride and a eutectic of barium fluoride and calcium fluoride. The shell portion is preferably compressed on the base portion so that it forms a smooth low friction mating surface on the seal and the shell portion preferably further comprises between approximately 1% and 30% by weight of a mixture consisting of graphite and an oxidation inhibitor selected from a group consisting of aluminum metaphosphate and titanium diboride, wherein the weight ratio of graphite to oxidation inhibitor in the mixture is between approximately 50:1 and 1:1. The seal preferably further comprises a metal sheet having a melting point of at least approximately 1400° F. on the inwardly facing side of the base portion and the vermiculite preferably has a mean particle size of less than approximately 10 microns. The fibers in the seal preferably consist of fibers, including whiskers, selected from a group consisting of metal fibers having a melting point above approximately 1650° F., alumina fibers and boron fibers and in the preferred embodiment of the seal the fibers comprise stainless steel fibers.

In order to form a seal of the above type in accordance with the method of the instant invention a compressed wire mesh base portion is first formed and thereafter a formable composition is applied to the base portion to form a shell portion thereon. The formable composition which is applied to the base portion preferably comprises between approximately 5% and 65% by weight of a mixture consisting of between approximately 4% and 40% by weight of water and between approximately 60% and 96% by weight of vermiculite having an aspect ratio of at least approximately 10 and a mean particle size of less than approximately 50 microns. The formable composition further comprises between approximately 10% and 88% by weight of fibers selected from a group consisting of alumina fibers, boron fibers and fibers of one or more metals having a melting point of at least approximately 1400° F., and between approximately 10% and 88% by weight of a solid lubricant selected from a group consisting of barium fluoride, calcium fluoride, cerium fluoride and a eutectic of barium fluoride and calcium fluoride. After the formable composition has been applied to the base portion, the base portion with the formable composition thereon is heated to evaporate substantially all of the water from the formable composition and the water free formable composition is then compressed to form a compressed shell portion on the base portion having a substantially smooth outer surface thereon. In particular, both the base portion and the shell portion are preferably compressed so that the total volume of the voids in the entire seal structure is less than approximately 50% of the seal volume and so that the total volume of the voids in the shell portion is less than approximately 40% of shell portion volume. The formable mixture which is applied to the base portion preferably further comprises between approximately 1% and 30% by weight of a mixture consisting of graphite plus an oxidation inhibitor selected from a group consisting of aluminum metaphosphate and titanium diboride wherein the ratio of graphite to oxidation inhibitor is between approximately 50:1 and 1:1. Further, the step of forming the base portion preferably includes a step of applying a metal sheet to the inwardly facing side of the wire mesh ring before compressing the wire mesh ring to form the base portion. The metal sheet preferably has a melting point of at least approximately 1400° F. and preferably at least approximately 1650° F. Further, the vermiculite preferably has a mean particle size of less than approximately 10 microns and the fibers in the composite material preferably have a melting point of at least approximately 1650° F.

Accordingly, it is a primary object of the instant invention to provide an effective high temperature seal for a flexible joint for an automotive exhaust system.

Another object of the instant invention is to provide a high temperature seal which can be effectively utilized in a flexible joint in an exhaust system without producing squeaking noises.

An even further object of the instant invention is to provide a method of making an improved high temperature seal for an exhaust system.

An even still further object of the instant invention is to provide an effective method of making a seal which can be utilized in a flexible joint in a high temperature exhaust system without producing squeaking noises.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the seal of the instant invention;

FIG. 1A is a sectional view taken along line 1A—1A in FIG. 1; and

FIGS. 2-9 are sequential views illustrating the method of the instant invention as it is applied to forming a seal of the type illustrated in FIGS. 1 and 1A.

DESCRIPTION OF THE INVENTION

Figure 5:
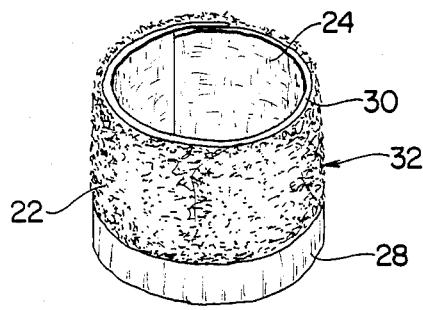

Referring now to the drawings, the high temperature low friction seal of the instant invention is illustrated and generally indicated at 10 in FIGS. 1 and 1A. The seal 10 comprises a base portion generally indicated at 12 and an outer dry rubbing composite or shell portion generally indicated at 14 on the base portion 12, the shell portion 14 defining a low friction outer mating surface 16 on the seal 10. The seal 10 as herein embodied is specifically adapted for use in a flexible joint of a high temperature automotive exhaust system, although it will be understood that it can also be adapted for use in various other high temperature applications.

The base portion 12 comprises a core 18 which is preferably made from a compressed knitted wire mesh and a metal sheet 20 on the core 18. The core 18 is preferably constructed from stainless steel wire and in the embodiment herein set forth it is formed as a compressed knitted wire mesh ring having inwardly and outwardly facing sides. The sheet 20 preferably comprises a thin sheet of stainless steel foil which extends over the inwardly facing side and both ends of the base portion 12 as illustrated in FIG. 1A.

The outer dry rubbing composite or shell portion 14 comprises a compressed mixture of high aspect ratio vermiculite, high temperature resistant fibers, including whiskers, and a high temperature solid lubricant. More specifically, the shell portion 14 comprises between approximately 2% and 30% by weight of vermiculite having an aspect ratio (length or width/thickness) of at least approximately 10 and a mean particle size of less than approximately 50 microns, between approximately 10% and 88% by weight of high temperature resistant fibers, including whiskers, having a melting point of at least approximately 1400° F. and between approximately 10% and 88% by weight of a solid lubricant consisting of one or more materials selected from a group consisting of barium fluoride, calcium fluoride, cerium fluoride and a eutectic of barium fluoride and calcium fluoride. The vermiculite preferably has a particle size of less than approximately 10 microns. The temperature resistant fibers preferably comprise either milled or chopped fibers, including whiskers, of either alumina, boron or a metal having a melting point of at least approximately 1650° F. For example, chopped or milled stainless steel fibers have been found to be particularly effective in the seal of the instant invention. The shell portion 14 preferably further comprises between approximately 1% and 30% by weight of a mixture consisting of graphite and an oxidation inhibitor selected from a group consisting of aluminum metaphosphate and titanium diboride wherein the weight ratio of graphite to oxidation inhibitor is between approximately 50:1 and 1:1. The outer shell portion 14 is preferably compressed on the wire mesh base portion so that the volume of the voids therein is less than approximately 40% of the shell portion 14 and so that the shell portion 14 has a substantially smooth outer surface 16.

It has been found that the above components seal of the instant invention cooperate in a unique way to provide specific advantages over the heretofore available high temperature seals. In particular, it has been found that the vermiculite of the seal functions as an adhesive binding agent which binds the remaining components of the shell portion together. In this regard, it has been found that the binding forces of the vermiculite are directly related to the aspect ratio thereof and that by maintaining the dimensions of the vermiculite particles substantially within the ranges herein specified the vermiculite is able to effectively bind the remaining components of the shell portion together. It has also been found that the vermiculite of the seal of the instant invention functions as a high temperature lubricant although its primary purpose is to function as a binding agent. The high temperature lubricant of the seal as hereinabove specified is effectively operative for lubricating the outer surface 16 so that it can pass over a mating surface of a flexible joint at high temperatures without producing squeaking noises and the fibers of the seal are effectively operative for brushing the mating surface of a mating joint component in which the seal 10 is assembled in order to prevent adhesion between the seal and the joint component. It has also been found that the fibers function to modulate wear by reducing the rate at which material is lost from the shell portion 14 through rubbing. The graphite which is present in the preferred formulation of the shell portion operates to provide a further solid lubricant which provides lubrication over the lower temperature ranges to which the seal is exposed and the oxidation inhibitor inhibits the oxidation of the graphite to enable it to be exposed to elevated temperatures without immediately oxidizing.

Figure 6:
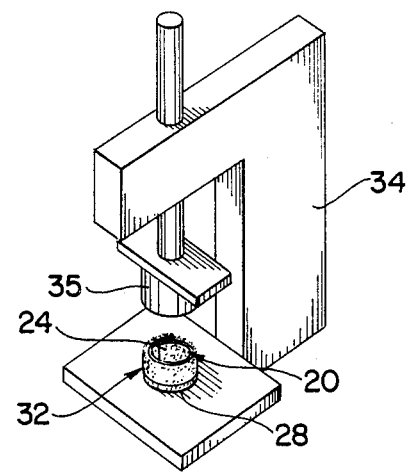
Figure 7:
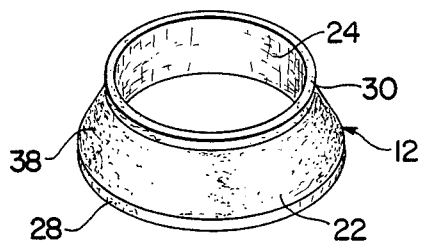
Figure 8:
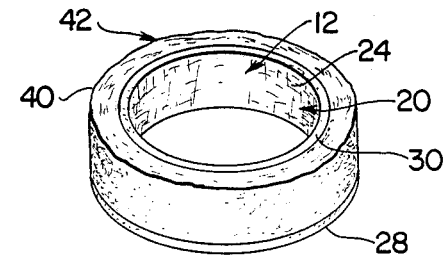
Figure 9:
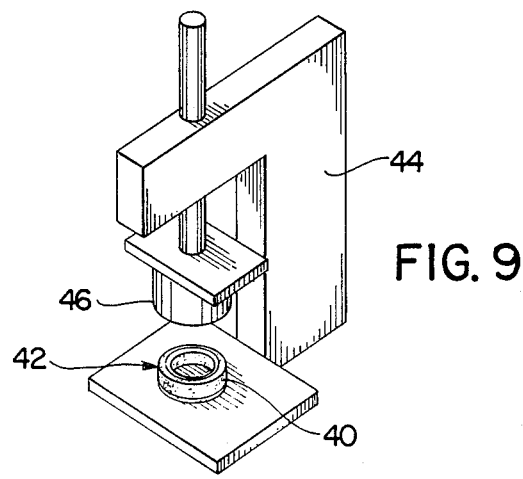

Referring now to FIGS. 2 through 9, the method of making the seal of the instant invention is illustrated. In this regard, as illustrated in FIG. 2, in the first step of the method a knitted wire mesh strip 22 is formed from a high temperature resistant wire, such as stainless steel wire. Thereafter, as illustrated in FIGS. 3 and 4 the strip 22 is assembled with a metal sheet 20 having a main portion 24, an elongated neck portion 26 and a pair of opposite upwardly bent peripheral flanges 28 and 30. The sheet 24 which is preferably made of a metal or a metal alloy, such as stainless steel having a melting point of at least approximately 1400° F. and preferably at least approximately 1650° F. is assembled with the strip 22 in the manner illustrated so that the opposite flanges 28 and 30 are folded over onto the strip 22. Thereafter, as illustrated in FIG. 5 the strip 22 with the sheet 20 thereon is rolled into a ring generally indicated at 32. As will be seen, when the sheet 20 and the strip 22 have been rolled into the ring 32 the main portion 24 extends over the entire inner surface of the ring 32 and the flange 28 extends over the edges of the strip 22 at one end of the ring 32 and upwardly a distance along the outer surface of the ring 32. The flange 30, on the other hand, extends over only the edges of the innermost portions of the strip 22 as illustrated. The strip 22 defines the remaining outer surface portions of the ring 32 as illustrated in FIG. 6. In the next step of the method, the ring 32 is compressed utilizing a conventional press 34 to form a compressed base portion 12. In this regard, at this point in the method the base portion is preferably only partially compressed by exposing it to relatively low compression forces of less than approximately 10 tons. However, the ring 32 is preferably compressed to form the base portion 12 so that it is tapered as illustrated and so that it has a concave outer surface 38 which is defined solely by the wire in the compressed strip 22. The remaining surfaces of the ring 36 are defined by various portions of the sheet 20 as illustrated. After the base portion 12 has been formed in this manner, an outer shell composite 40 is applied thereto to form the intermediate seal assembly generally indicated at 42 in FIG. 8. The shell composite 40 is preferably applied to the base portion 12 as a formable aqueous paste-like mixture comprising a water mixture of the shell components hereinabove set forth. In this regard, in order to prepare a formable mixture of this type high aspect ratio vermiculite having particle sizes within the ranges hereinabove set forth is preferably added to the remaining components of the shell composite 40 as an aqueous vermiculite mixture comprising a sufficient quantity of water so that the water comprises between approximately 4% and 40% by weight of the formable paste-like mixture. It has been found that an aqueous vermiculite coating composition of the type set forth in the U.S. Pat. No. 4,425,465 to PADGET et al., can be effectively utilized as a source of aqueous vermiculite mixture in the seal of the subject invention. In any case, the formable shell composite material is applied to the concave outer surface 38 of the base portion 12 and it is formed so that the intermediate seal assembly 42 has a substantially cylindrical outer configuration. After the shell composite 40 has been formed on the base portion 12, the intermediate seal assembly 42 is heated to evaporate substantially all of the water from the shell composite 40. Thereafter, as illustrated in FIG. 9 the intermediate seal assembly 42 is compressed in a second press 44 having a die 46 to compress the shell composite 40 and to further compress the base portion 12 to form the finished seal 10. In this regard, the press 44 is preferably operated to compress the shell composite 40 to a density wherein it has less than approximately 40% voids and to compress the overall seal 10 to density wherein it has less than approximately 50% voids. The die 46 which is utilized to compress the intermediate seal assembly is preferably adapted to form the outer surface 16 into a smooth rounded configuration as illustrated in FIGS. 1 and 1-A. It has been found that compression forces in the range of between 60 and 100 tons are generally necessary to form seals of the type illustrated having internal diameters of between approximately 2 and 2½ inches.

It has been found that the seal of the instant invention as constructed in accordance with the above method has specific advantages over the heretofore available seals. In particular, it has been found that the seal of the instant invention can withstand prolonged exposure to high temperatures and that it can be effectively utilized to provide a substantially leak-proof joint which is substantially free from objectionable squeaking noises. In this regard, it has been found that the compressed knitted wire mesh base portion 12 of the seal of the instant invention provides an effective and durable base portion and that the sheet 24 increases the ability of the seal to resist gas penetration. The shell portion 14, on the other hand, is able to withstand prolonged exposure to high temperatures and it includes an effective lubricated outer surface 16 which enables the seal to engage a mating component of a flexible joint without producing objectionable squeaking noises. In this regard, the vermiculite in the shell portion 14 effectively acts as an adhesive binder which binds the remaining components of the shell portion 14 together whereas the metal fibers in the shell portion 14 are operative for brushing the surface of a mating component to prevent adhesion between the seal and the mating component. On the other hand, the solid lubricant in the shell portion operates to effectively lubricate the surface 16. Further, in the preferred form of the seal 10 the graphite acts to further lubricate the surface 16 and the oxidation inhibitor retards the oxidation of the graphite at elevated temperatures. Accordingly, it is seen that the seal and method of the instant invention represent significant advancements in the art relating to high temperature seals which have particular application in the automotive industry.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A high temperature low friction seal comprising a compressed wire mesh base portion and a shell portion on said base portion, said shell portion comprising between approximately 2% and 30% by weight of vermiculite having an aspect ratio of at least approximately 10 and a mean particle size of less than approximately 50 microns, between approximately 10% and 88% by weight of high temperature resistant fibers having a melting point of at least approximately 1400° F. and between approximately 10% and 88% by weight of a solid lubricant consisting of one or more materials selected from a group consisting of barium fluoride, calcium fluoride, cerium fluoride and a eutectic of barium fluoride and calcium fluoride, said shell portion defining a substantially smooth low friction mating surface on said seal.

2. In the seal of claim 1, said shell portion further comprising between approximately 1% and 30% by weight of a mixture consisting of graphite and an oxidation inhibitor selected from a group consisting of aluminum metaphosphate and titanium diboride.

3. In the seal of claim 2, the weight ratio of graphite to oxidation inhibitor in said mixture being between approximately 50:1 and 1:1.

4. The seal of claim 1 further characterized as a high temperature seal ring said base portion further characterized as being of ring-shaped configuration, said base portion having inwardly facing and outwardly facing sides, said shell portion being disposed on the outwardly facing side of said base portion and defining an outwardly facing mating surface on said seal ring.

5. The seal of claim 4 further comprising a metal sheet on the inwardly facing side of said base portion, said metal sheet being constructed of a metal having a melting point of at least approximately 1400° F.

6. In the seal of claim 1, said shell portion further characterized as being compressed.

7. In the seal of claim 1, said base portion further characterized as a compressed knitted wire mesh base portion.

8. In the seal of claim 1, said vermiculite having a particle size of less than approximately 10 microns.

9. In the seal of claim 1, said fibers being selected from a group consisting of metal fibers, alumina fibers and boron fibers.

10. In the seal of claim 1, said fibers having a melting point above approximately 1650° F.

11. In the seal of claim 10, said fibers further characterized as stainless steel fibers.

12. A method of making a high temperature low friction seal comprising the steps of:
   a. forming a compressed wire mesh base portion;
   b. applying a formable composition to said base portion, said formable composition comprising between approximately 5% and 65% by weight of a mixture consisting of between approximately 4% and 40% by weight of water and between approximately 60% and 96% by weight of high aspect ratio vermiculite, said vermiculite having an aspect ratio of at least 10 and a mean particle size of less than approximately 50 microns, said formable composition further comprising between approximately 10% and 88% by weight of fibers selected from a group consisting of alumina fibers, boron fibers and fibers of one or more metals having a melting point above approximately 1400° F., and between approximately 10% and 88% by weight of a solid lubricant consisting of one or more materials selected from a group consisting of barium fluoride and calcium fluoride, cerium fluoride and a eutectic of barium fluoride and calcium fluoride;
   c. heating said base portion with said formable composition thereon to evaporate substantially all of the water from said formable composition; and
   d. compressing said formable composition from which said water has been evaporated to form a compressed shell portion on said base portion having a substantially smooth outer surface thereon.

13. In the method of claim 12, said formable mixture further comprising between approximately 1% and 30% by weight of a mixture consisting of graphite plus an oxidation inhibitor selected from a group consisting of aluminum metaphosphate and titanium diboxide, wherein the weight ratio of graphite to oxidation inhibitor is between approximately 50:1 and 1:1.

14. In the method of claim 12, said forming step further characterized as forming a compressed wire mesh base portion of ring-shaped configuration having a substantially circular inner surface and an outer circumferential surface, said step of applying said formable composition further characterized as applying said formable composition to the outer circumferential surface of said base portion.

15. In the method of claim 14, said forming step further characterized as forming a knitted wire mesh ring and compressing said knitted wire mesh ring to form a compressed wire mesh ring.

16. In the method of claim 15, said knitted wire mesh ring having inwardly and outwardly facing sides, said forming step further comprising applying a metal sheet to the inwardly facing side of said knitted wire mesh ring before compressing same, said metal sheet having a melting point of at least approximately 1400° F.

17. In the method of claim 16, said metal sheet having a melting point of at least approximately 1650° F.

18. In the method of claim 12, said vermiculite having a mean particle size of less than approximately 10 microns.

19. In the method of claim 12, said fibers having a melting point above approximately 1650° F.

20. In the method of claim 12, said fibers further characterized as stainless steel fibers.

* * * * *